(12) United States Patent
Zaitoun et al.

(10) Patent No.: US 9,267,257 B2
(45) Date of Patent: Feb. 23, 2016

(54) USE OF THERMO-THICKENING POLYMERS IN THE GAS- AND OILFIELD INDUSTRY

(71) Applicant: Poweltec, Rueil Malmaison (FR)

(72) Inventors: Alain Zaitoun, Rueil Malmaison (FR); Guillaume Dupuis, Rueil Malmaison (FR); Rashid Al Maamari, Al-Khodh (OM); Abdulaziz Al Hashmi, Al-Khodh (OM); Hamed Al Sharji, Muscat (OM)

(73) Assignee: Poweltec, Rueil Malmaison (FR)

(*) Notice: Subject to any disclaimer, the term of this patent is extended or adjusted under 35 U.S.C. 154(b) by 0 days.

(21) Appl. No.: 14/425,162

(22) PCT Filed: Aug. 29, 2013

(86) PCT No.: PCT/EP2013/067941
§ 371 (c)(1),
(2) Date: Mar. 2, 2015

(87) PCT Pub. No.: WO2014/033233
PCT Pub. Date: Mar. 6, 2014

(65) Prior Publication Data
US 2015/0233073 A1    Aug. 20, 2015

(30) Foreign Application Priority Data
Sep. 3, 2012    (FR) .................................... 12 58192

(51) Int. Cl.
*E02D 3/12* (2006.01)
*C09K 8/56* (2006.01)
(Continued)

(52) U.S. Cl.
CPC ... *E02D 3/12* (2013.01); *C09K 8/56* (2013.01); *C09K 8/5758* (2013.01); *C09K 8/588* (2013.01);
(Continued)

(58) Field of Classification Search
CPC ........ E02D 3/12; E21B 33/138; E21B 43/025
USPC .......... 405/267–269; 166/293, 294, 295, 270, 166/285, 292, 300, 305.1
See application file for complete search history.

(56) References Cited

U.S. PATENT DOCUMENTS 4,500,437 A * 2/1985 Engelhardt ........... C08F 220/56
137/13
4,870,167 A * 9/1989 Zody ................... C08B 37/0087
536/114

(Continued)

FOREIGN PATENT DOCUMENTS

EP    0 583 814 A1    2/1994
EP    1 086 976       3/2001

(Continued)

OTHER PUBLICATIONS

International Search Report and Written Opinion for Application No. PCT/EP2013/067941 dated Nov. 14, 2013.

(Continued)

*Primary Examiner* — Frederick L Lagman
(74) *Attorney, Agent, or Firm* — Alston & Bird LLP

(57) ABSTRACT

A process for the treatment of a rock formation or cavity, including the step of injecting, into the rock formation or cavity, a water solution of a water-soluble thermo-thickening polymer, the thermo-thickening polymer being able to form a gel at a threshold temperature ($T_g$), an inner temperature ($T_{int}$) of the rock formation or cavity being equal or superior to the threshold temperature ($T_g$), the process being characterized in that the thermo-thickening polymer is a cellulose chain, partially etherified with $C_1$-$C_6$ alkyl or hydroxyalkyl groups, or a polyacrylamide-based copolymer including N-isopropylacrylamide and/or N-vinylpyrrolidone groups. Such a process is advantageous for water shutoff in gas- or oilfields, or to solve to water channelling problems between injection wells and production wells.

8 Claims, 1 Drawing Sheet

(51) Int. Cl.
*C09K 8/588* (2006.01)
*C09K 17/42* (2006.01)
*E02D 3/00* (2006.01)
*E02D 31/04* (2006.01)
*E02B 3/16* (2006.01)
*C09K 8/575* (2006.01)
*E21B 43/02* (2006.01)

(52) U.S. Cl.
CPC . *C09K 17/42* (2013.01); *E02B 3/16* (2013.01); *E02D 3/00* (2013.01); *E02D 31/04* (2013.01); *E21B 43/025* (2013.01)

(56) References Cited

U.S. PATENT DOCUMENTS

| | | | | |
|---|---|---|---|---|
| 4,940,090 | A * | 7/1990 | Hoskin | C09K 8/512 166/270 |
| 5,106,423 | A * | 4/1992 | Clarke | C04B 7/527 106/714 |
| 5,292,367 | A * | 3/1994 | Bloys | C04B 24/003 106/724 |
| 5,476,718 | A * | 12/1995 | Ichizuka | C09K 3/10 405/267 |
| 6,579,909 | B1 | 6/2003 | Chauveteau et al. | |
| 8,333,242 | B2 * | 12/2012 | Gupta | C09K 8/12 166/288 |
| 8,752,624 | B2 * | 6/2014 | Reichenbach-Klinke | C09K 8/584 166/270.1 |
| 8,763,698 | B2 * | 7/2014 | Reichenbach-Klinke | C09K 8/508 166/275 |
| 8,939,206 | B2 * | 1/2015 | Langlotz | C09K 8/588 166/270 |
| 2008/0096774 | A1 | 4/2008 | Tabary et al. | |
| 2009/0304457 | A1 * | 12/2009 | Shimada | C09K 17/06 405/269 |
| 2010/0206569 | A1 * | 8/2010 | Gupta | C09K 8/12 166/302 |
| 2012/0264655 | A1 * | 10/2012 | Fitch | C09K 8/12 507/101 |
| 2013/0105165 | A1 * | 5/2013 | Reichenbach-Klinke | C08F 220/26 166/305.1 |

FOREIGN PATENT DOCUMENTS

WO WO 2006/024795 A2 3/2006
WO WO 2007/141731 A1 12/2007

OTHER PUBLICATIONS

International Preliminary Report on Patentability for Application No. PCT/EP2013/067941 dated Oct. 27, 2014.
Sydansk et al., *Field Testing of a New Conformance Improvement Treatment Chromium (III) Gel Technology,* Paper SPE 17383, SPE Enhanced Oil Recovery Symposium, Tulsa, OK (1988).
Sydansk, R. D., *A Newly Developed Chromium(III) Gel Technology,* SPE Reservoir Evaluation (1990) 346-352.

* cited by examiner

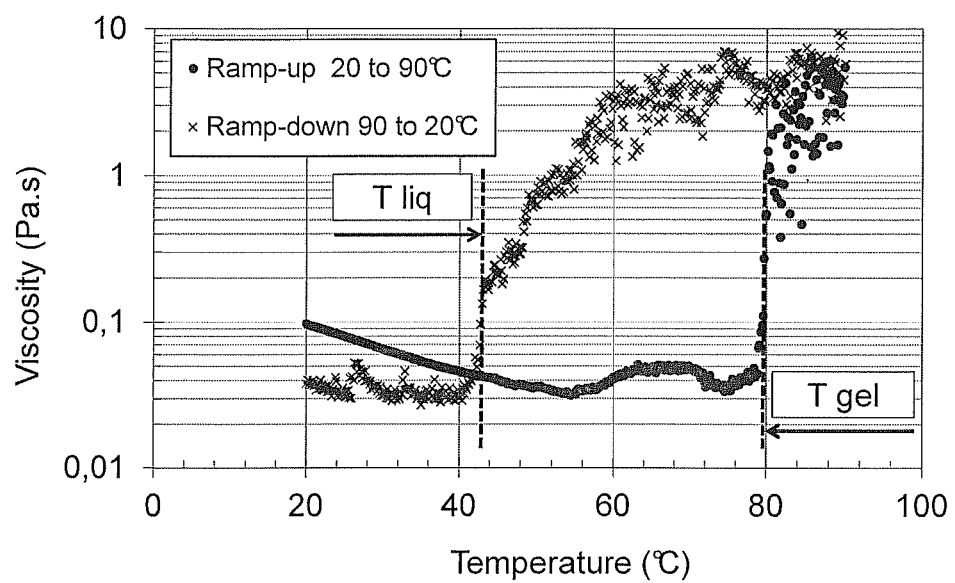

USE OF THERMO-THICKENING POLYMERS IN THE GAS- AND OILFIELD INDUSTRY

The present invention relates to the use of polymers in the gas- and oilfield industry, more particularly to the use of thermo-thickening polymers.

BACKGROUND

Natural resources such as gas and oil can be recovered from subterranean formations using well-known techniques. In particular, thermo-thickening compounds are known to be incorporated as thickening agents in fracturing fluids, drilling fluids or completion fluids in the gas- and oilfield industry, as illustrated in documents such as EP0583814 and US2010/0206569.

Unwanted water production in association with crude oil is one of the major production difficulties for the petroleum industry, as more reservoirs become mature. Problems due to water production often decrease the economic performance of a well.

In order to reduce excessive water production, it is known to inject, in injection and production wells, a gelling system made of a water-soluble polymer and a cross-linking agent in aqueous solution. After a sufficient time, the solution sets into a semisolid mass and behaves as a water diverting or blocking agent, while remaining permeable to oil.

It is known to use a polyacrylamide/chromium acetate system as a gelling system (Sydansk et. al., *Field Testing of a New Conformance improvement Treatment Chromium (III) Gel Technology*, Paper SPE 17383 presented at the SPE Enhanced Oil Recovery Symposium, Tulsa, Okla., 1988). However, the gelation time depends on the kinetics of reaction between the polymer and the cross-linking agent, whereas the reaction conditions, inside the wells, are difficult to control. Moreover, the use of chromium salts can lead to environmental pollution problems.

Another problem encountered in the oil or gas industry relates to water channelling problems between injection wells and production wells. When injected into the injection well, water may follow a preferential pathway through high-permeability streaks of the reservoir. Some oil- or gas-rich zones, of lower water permeability, remain unswept by the water flow.

Therefore, the production of such wells could be improved by selectively blocking the "preferential pathway", diverting water to the previously unswept zones.

Known thermo-thickening compounds, such as polyethyleneglycol polymers (POE) described in EP0583814, would however be unsuitable for such a use, due to their low resistance to shearing.

SUMMARY

In order to solve the above mentioned problems, the present invention relates to a process for the treatment of a rock formation or cavity, comprising the following steps:
  injection, into said rock formation or cavity, of a water solution of a water-soluble thermo-thickening polymer, said thermo-thickening polymer being able to form a gel at a threshold temperature, the water solution being injected in liquid form, at an injection temperature inferior to said threshold temperature, the thermo-thickening polymer being a cellulose chain, partially etherified with $C_1$-$C_6$ alkyl or hydroxyalkyl groups, or a polyacrylamide-based copolymer including N-isopropylacrylamide (NIPAM) and/or N-vinylpyrrolidone groups;
  formation of a gel by the water solution inside the rock formation or cavity, at an inner temperature of the rock formation or cavity being equal or superior to said threshold temperature.

In the context of the invention, the term "thermo-thickening polymer" applies to water-soluble compounds having some substituent groups in the macromolecular chains. An aqueous solution of said compounds behaves as a more or less viscous fluid at low temperatures superior to 0° C. Above a threshold temperature, the substituent groups acquire hydrophobic properties. The viscosity of the solution increases dramatically, due to the relative bonding of the hydrophobic groups, forming a gel.

The partially etherified cellulose derivatives are known for their thermo-thickening properties and are used as thickeners in the medical and food industry. Polymers including NIPAM are also used as thickeners in the medical industry.

The gel formation spontaneously occurs at the threshold temperature, also called "gel temperature", or "lower critical solution temperature" (LCST) such as in document EP0583841. Therefore, there is no need to control the kinetics of reaction between a polymer and a cross-linking agent.

As biopolymers, cellulose derivatives are non-toxic and their use in the petroleum industry would not lead to environmental pollution. The NIPAM polymers are also environmental friendly products.

Therefore, it is advantageous to use cellulose derivative solutions as gelling systems, or NIPAM polymers for water shutoff in gas or oil wells, to replace compounds such as the above mentioned polyacrylamide/chromium systems.

Moreover, the invention provides a solution to the water channelling problems. The thermo-thickener solution is injected into the reservoir through the injection well and preferentially invades the high-permeability streak. The gel formation then blocks the "preferential pathway", allowing the subsequent water to sweep the other zones of the reservoir.

In both of the above mentioned examples of use of the invention, it is advantageous to select the thermo-thickening polymer depending on the temperature of the subterranean zone where the gel formation is desired. As the inner temperatures of the subterranean cavities are generally higher than the surface temperature of the wells, the thermo-thickening polymer water solutions can be injected as fluids and spontaneously form a gel when reaching the desired zone.

The injection temperature of the thermo-thickener solution is preferably chosen low enough to allow the solution to reach a deep part of the "preferential pathway" before turning into a gel. Preferably, the injection temperature is more than 10° C. lower than the threshold temperature of the thermo-thickener solution.

For maintaining the thermo-thickener solution at a fluid state during the injection, it is preferable to cool the rock formation or cavity by injecting a pre-flush of water into it, before injecting the thermo-thickener solution. The temperature of the pre-flush water is lower than the threshold temperature for an efficient cooling of the rock. Preferably, the temperature of the pre-flush water is more than 10° C. lower than the threshold temperature of the thermo-thickener solution.

After the thermo-thickener injection is completed, the temperature of the rock increases again and the gel forms in situ.

In the case of a production well, it is preferable to inject a post-flush of water into the rock formation or cavity, between the injection of the thermo-thickening polymer solution and the formation of the gel. In this manner, the post-flush water can displace the thermo-thickener solution from the well column. The post-flush volume can be comprised between 1.1 and 1.5 volume of the column. Such a step can also be applied to the injection wells, with possibly more important volumes in order to make the gel form in the depths of the reservoir.

In a preferred form of the invention, the thermo-thickening polymer is chosen among methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose. Cellulosic chains can also be grafted with N-isopropyl acrylamide groups (NIPAM) or vinyl-pyrrolidone groups (NVP) and mixtures thereof.

In another form of the invention, the thermo-thickening polymer is a polyacrylamide-based copolymer including NIPAM and/or NVP groups, the copolymer containing or not acrylamide methylpropane sulfonic acid groups (AMPS).

In a more preferred form of the invention, the water solution contains a single type of cellulose derivative or polyacrylamide-based copolymer including NIPAM and/or NVP, corresponding to the desired gel temperature. However, in order to modify the gelling conditions, it is possible to use mixtures of cellulose derivatives and/or polyacrylamide-based copolymers.

In a preferred form of the invention, the concentration of the thermo-thickening polymer water solution ranges between 2500 ppm and 20000 ppm, preferably between 2500 ppm and 12500 ppm. In the following examples, the best gel qualities were obtained in such a range of concentrations.

In a preferred form of the invention, the thermo-thickening polymer water solution also comprises up to 20% by weight of an inorganic salt. As reported in the following examples, the brine salinity may influence the gel temperature. Preferred salts are KCl and NaCl, but divalent salts, such as $CaCl_2$ or $MgCl_2$ may also be used.

It is possible to add another polymer or microgel to the water solution, in order to modify the gel consistency. In a preferred form of the invention, the thermo-thickening polymer water solution also comprises an acrylamide-based polymer or copolymer, such as a polyacrylamide. The concentration of said polymer or copolymer may be chosen between 50 and 10000 ppm, said concentration being lower than or equal to the thermo-thickening polymer concentration.

In another preferred form of the invention, the thermo-thickening polymer water solution also comprises a microgel at a concentration between 50 and 5000 ppm, the microgel concentration being lower than or equal to the thermo-thickening polymer concentration.

A microgel, as defined in the present invention, consists of micro-particles such as obtained by gelation of a polymer and cross-linking agent system. A microgel preparation method is described in EP1086976.

Microgels are already known as thickening agents or selective permeability reducing agents in the petroleum industry, as described in WO2006/024795.

BRIEF DESCRIPTION OF THE DRAWINGS

FIG. 1 displays the viscosity variations of a THR-2 solution during a temperature ramp up followed by a ramp down.

DETAILED DESCRIPTION

The following examples illustrate the invention without however limiting its scope.

Example 1

Preparation of Thermo-Thickening Solutions 1.1—Thermo-Thickeners (THR)

The thermo-thickening polymers, or thermo-thickeners, are produced from cellulose fibres which are partially etherified by substitution groups. They are available in powder or in aqueous solution form.

The polymers contain anhydroglucose units, whose general formula is $C_6H_7O_2$ (OR1) (OR2) (OR3). These groups give hydrophilic and hydrophobic zones to the macromolecule. The repartition of these zones along the macromolecular chain induces variable thermo-thickening properties. Table 1 below gives a description of the different products tested in the present examples.

TABLE 1

| Product | Description | Formula | Comments |
|---|---|---|---|
| THR-1 | Methylhydroxy ethylcellulose<br>Powder, Moisture = 2%<br>Viscosity 2% sol = 42250 mPas<br>Particle size = 299 μm | $C_6H_7O_2(OR1)(OR2)(OR3)$<br>R1 = $CH_3$<br>R2 = H<br>R3 = $CH_2H_3$ | white powder<br>odorless<br>delayed solubility |
| THR-2 | Methylhydroxy ethylcellulose<br>Powder, Moisture = 2.4%<br>Viscosity 2% sol = 7900 mPas<br>Particle size = 257 μm | $C_6H_7O_2(OR1)(OR2)(OR3)$<br>R1 = $CH_3$<br>R2 = H<br>R3 = $CH_2H_3$ | white powder<br>odorless<br>delayed solubility |
| THR-3 | Methyl cellulose<br>higher substitution level<br>Powder, Moisture = 3.4%<br>Viscosity 2% sol = 2400 mPas<br>Particle size = 356 μm | $C_6H_7O_2(OR1)(OR2)(OR3)$<br>R1, R2, R3 = $CH_3$ | white powder<br>odorless |
| THR-4 | Hydroxypropyl methylcellulose type J<br>Methoxyl degree of substitution = 1.3%<br>Methoxyl = 17.8%<br>Hydroxypropyl = 25.8%<br>Powder, Moisture = 2.9% | $C_6H_7O_2(OR1)(OR2)(OR3)$<br>R1 = H<br>R2 = $CH_2CH_2CH_3$<br>R3 = $CH_3$ | white powder<br>odorless |
| THR-5 | Methylcellulose type A<br>Degree substitution = 1.7<br>Mw (g/mol) = 14900<br>Methoxyl = 30% | $C_6H_7O_2(OR1)(OR2)(OR3)$<br>R1, R2, R3 = $CH_3$ | white powder<br>odorless |
| THR-6 | Hydroxypropyl methylcellulose type F<br>viscosity 2% sol = 4365 mPas<br>sodium chloride = 0.7%<br>Powder, Moisture = 5.7% | $C_6H_7O_2(OR1)(OR2)(OR3)$<br>R1 = H<br>R2 = $CH_2C_2H_3$<br>R3 = $CH_3$ | white powder<br>odorless |

TABLE 1-continued

| Product | Description | Formula | Comments |
|---|---|---|---|
| THR-7 | Methyl cellulose type A<br>Methoxyl degree of substitution = 1.9%<br>Mw (g/mol) = 409000<br>Methocyl = 30% | $C_6H_7O_2(OR1)(OR2)(OR3)$<br>R1, R2, R3 = $CH_3$ | white powder odorless |
| THR-8 | Cellulose ether<br>Methoxyl degree of substitution = 1.8%<br>Methocyl = 30%<br>Mw (g/mol) = 31500 | | white powder odorless |
| THR-9 | NIPAM-grafted polyacrylamide<br>NIPAM degree of substitution = 10% | Acrylamide: 90%<br>N-isopropylacrylamide: 10% | white powder odorless |

THR solutions were prepared at 5 000, 7 500 and 10 000 ppm in tap water and in different KCl brines. To obtain the final solution the THR powder was added to the brine and maintained under vigorous agitation for four hours.

1.2—Brines

Make-up brines used in the present examples were made from tap water and KCl at concentrations ranging between 0 and 10%.

1.3—Polymer and Microgel

The polymer used in the present examples is a polyacrylamide powder (P-100) with a molecular weight of $8 \times 10^6$ Dalton. P-100 was dissolved in brine by slow agitation for 24 hours.

The microgel used in the present examples is a 2 μm Microgel with soft consistency. The microgel was dissolved in brine under strong agitation for 10 minutes, then by slower agitation for 2 hours.

Polymer or Microgel were added at concentrations ranging between 1 000 and 5 000 ppm to the THR solutions.

Example 2

Gelation Tests

The rheometer used for the gelation tests was the Carrimed $CSL^2 100$ from TA Instrument. The experiment consisted in pouring a few drops of THR solution on the plate of the rheometer, then covering with another plate (4 cm diameter) until obtaining a liquid film with a thickness of 200 μm. A thin film of oil was poured around the plate to prevent evaporation of the solution during the test.

2.1—Gel Temperature

Measurements started with a slow rotation to monitor viscosity value versus time, during a ramp-up of temperature (from 20 to 90° C.).

FIG. 1 displays the viscosity variations of a THR-2 solution during a temperature ramp up followed by a ramp down. Each part of the curve displays a sudden change in slope (due to viscosity change) at a critical temperature, which is identified as the gel temperature. The gel temperature observed during the ramp up is higher than the gel temperature observed during the ramp down, revealing a hysteresis effect.

For the other thermo-thickeners, the gel temperatures were determined through a temperature ramp up only.

Three series of gelation tests were conducted:

i) THR 1 to 8 were tested at 5 000 and 7 500 ppm, with tap water+1% KCl brine;

ii) The range of THR concentration was broadened (3 000, 5 000 and 7 500 ppm) as well as the salinity (Tap water, KCl 1 and 2%) for three products only, namely THR-2, THR-5 and THR-7.

iii) Broader ranges of THR concentration (5 000, 7 500 and 10 000 ppm) and higher salinity (KCl 5 and 10%) were tested for THR-5 and THR-7.

The observed gel temperatures $T_g$ are summarized in Table 2 below:

TABLE 2

| Product | Brine | Concentration (ppm) | GelTemp. $T_g$ (° C.) | Product | Brine | Concentration (ppm) | GelTemp. $T_g$ (° C.) |
|---|---|---|---|---|---|---|---|
| THR-1 | Tap | 5000 | — | THR-5 | Tap | 3000 | 38 |
| | Water | 7500 | — | | Water | 5000 | 40 |
| | KCL 1% | 5000 | 75 | | | 7500 | 55 |
| | | 7500 | — | | KCL 1% | 3000 | 40 |
| THR-3 | Tap | 5000 | 60 | | | 5000 | 50 |
| | Water | 7500 | 60 | | | 7500 | 45 |
| | KCL 1% | 5000 | 55 | | KCL 2% | 3000 | 33 |
| | | 7500 | 55 | | | 5000 | 35 |
| THR-4 | Tap | 5000 | — | | | 7500 | 31 |
| | Water | 7500 | — | | KCL 5% | 5000 | 29 |
| | KCL 1% | 5000 | — | | | 7500 | 40 |
| | | 7500 | — | | | 10000 | 45 |
| THR-6 | Tap | 5000 | 75 | | KCL 10% | 5000 | 20 |
| | Water | 7500 | 70 | | | 7500 | 25 |
| | KCL 1% | 5000 | 70 | | | 10000 | 40 |
| | | 7500 | 65 | THR-7 | Tap | 3000 | 38 |
| THR-8 | Tap | 5000 | 55 | | Water | 5000 | 55 |
| | Water | 7500 | 60 | | | 7500 | 60 |

TABLE 2-continued

| Product | Brine | Concentration (ppm) | GelTemp. $T_g$ (°C.) | Product | Brine | Concentration (ppm) | GelTemp. $T_g$ (°C.) |
|---|---|---|---|---|---|---|---|
| | KCL 1% | 5000 | 45 | | KCL 1% | 3000 | 36 |
| | | 7500 | 45 | | | 5000 | 50 |
| THR-2 | Tap | 3000 | 60 | | | 7500 | 55 |
| | Water | 5000 | 80 | | KCL 2% | 3000 | 35 |
| | | 7500 | 80 | | | 5000 | 40 |
| | KCL 1% | 3000 | 45 | | | 7500 | 40 |
| | | 5000 | 75 | | KCL 5% | 5000 | 28 |
| | | 7500 | 80 | | | 7500 | 30 |
| | KCL 2% | 3000 | 40 | | | 10000 | 45 |
| | | 5000 | 52 | | KCL 10% | 5000 | 25 |
| | | 7500 | 67 | | | 7500 | 30 |
| | | | | | | 10000 | 35 |

2.2—Gel Stability

The gels obtained in tests ii) and iii) (section 2.1) were aged in an oven to check their long-term stability. Addition of a polymer or microgel was tested. The materials used and aging temperatures for the different systems were as follows:

2.2.1—THR-5 and THR-7 at 53° C.

THR-5 and THR-7 have the lowest gel temperature ($T_g$<50° C.). The following solutions were placed in an oven at 53° C. for aging.
   THRs at 3000 ppm+Tap water or KCl 1 and 2%
   THRs at 5000 ppm+Tap water or KCl 1, 2, 5 and 10%
   THRs at 7500 ppm+Tap water or KCl 1, 2, 5 and 10%
   THRs at 10000 ppm+KCl 5 and 10%

2.2.2—THR-2 at 90° C.

THR-2 has the highest gel temperature ($T_g$>70° C.). The following solutions were aged in an oven at 90° C.
   THR-2 at 3000 ppm+Tap water or KCl 1 and 2%
   THR-2 at 5000 ppm+Tap water or KCl 1 and 2%
   THR-2 at 7500 ppm+Tap water or KCl 1 and 2%

2.2.3—Microgel+THRs at 66° C.

The THR Used are THR-2, THR-3, THR-5 and THR-7.
The tests were performed in KCl 2%. The solutions had the following concentrations:
   5000 ppm THRs+1000 and 2000 ppm Microgel
   7500 ppm THRs+1000 and 2000 ppm Microgel 2.2.4—Polymer P-100+THRs at 86° C.

THR-1 and THR-2 were tested with the addition of a polyacrylamide (P-100). The solutions had the following compositions:
   P-100 at 2000 and 5000 ppm
   THRs at 5000 and 7500 ppm
   Tap water+KCl 2%

3—Results and Discussion 3.1—Gel Temperature

Two THRs—namely THR-1 and THR-4—did not gel in the tested temperature interval. They may have a higher gel temperature than 90° C.

All gel temperatures $T_g$ range between 25 and 80° C. As a main trend, it can be noticed that $T_g$ decreases when the salinity increases and $T_g$ increases when THR concentration increases, as summarized in Table 3 below:

TABLE 3

| | Evolution of Gel Temperature $T_g$ | |
|---|---|---|
| Product | THR Concentration | Salinity |
| THR-3 | = | − |
| THR-2 | + | − |
| THR-7 | + | − |
| THR-6 | − | − |
| THR-5 | + | + |
| THR-8 | + | − |

+: Increase
=: Unchanged
−: Decrease 3.2—Gel Stability 3.2.1—THR-5 and THR-7 at 53° C.

The main observations for these two materials are: gel with high syneresis at 3000 ppm, lower syneresis at 5000 ppm, and no syneresis at 7500 ppm.

The syneresis is the contraction of the gel accompanied with expulsion of water.

THR-7 is the product giving the lowest syneresis. It gives a hard elastic gel. The optimal formulation is with a concentration of 7500 ppm in KCl 2%.

3.2.2—THR-2 at 90° C.

Good gel quality was observed at 7500 ppm in KCl 2%

3.2.3—Gel after Addition of Microgel to THR Solutions

The Sydansk gel scale (visual observation—see R. D. SYDANSK, *SPE Reservoir Evaluation* (1990), 346-352) was used to check gel qualities, in a manner reported in Table 4.

TABLE 4

| Gel State | Description |
|---|---|
| A | No detectable gel formed. Gel appears to have some viscosity (fluidity) as original polymer solution and no gel is visually detectable. |
| B | Gel appears only slightly more viscous than original polymer solution. |

TABLE 4-continued

| Gel State | Description |
|---|---|
| C | Flowing gel. Most of obviously detectable gel flows to bottle cap upon inversion. |
| D | Moderately flowing gel. Small portion (5-15%) of gel does not readily flow to bottle cap upon inversion. |
| E | Barely flowing gel. Gel slowly flows to bottle cap and/or significant portion (>15%) of gel does not flow upon inversion. |
| F | Highly deformable non-flowing gel. Gel does not flow to bottle cap upon inversion (gel flows to just short of reaching bottle cap). |
| G | Moderately deformable non-flowing gel. Gel flows about halfway down bottle upon inversion. |
| H | Slightly deformable non-flowing gel. Only gel surface deforms slightly during inversion. |
| I | Rigid gel. There is no gel-surface deformation upon inversion. |
| J | Rigid ringing gel. Tuning-fork-like mechanical vibration can be felt or heard after bottle is tapped. |
| K | Rigid gel no longer ringing. No tone or vibration can be felt or heard, because natural frequency of gel has increased. |

Table 5 reports the gelation results after addition of microgel to the THR solutions at 66° C. Addition of microgel seems to weaken the gel consistency:

TABLE 5

| Test | KCl | Microgel | THR | Gel quality |
|---|---|---|---|---|
| THR-5 | | | | |
| Test 1 | 2% | 1000 ppm | 5000 ppm | B |
| Test 2 | 2% | 2000 ppm | 5000 ppm | B |
| Test 3 | 2% | 1000 ppm | 7500 ppm | B |
| Test 4 | 2% | 2000 ppm | 7500 ppm | A |
| Test 5 | 2% | — | 5000 ppm | H |
| Test 6 | 2% | — | 7500 ppm | I |
| Test 7 | 2% | 3000 ppm | 7500 ppm | A |
| THR-7 | | | | |
| Test 1 | 2% | 1000 ppm | 5000 ppm | C |
| Test 2 | 2% | 2000 ppm | 5000 ppm | C |
| Test 3 | 2% | 1000 ppm | 7500 ppm | C |
| Test 4 | 2% | 2000 ppm | 7500 ppm | C |
| Test 5 | 2% | — | 5000 ppm | H |
| Test 6 | 2% | — | 7500 ppm | I |
| THR-3 | | | | |
| Test 1 | 2% | 1000 ppm | 5000 ppm | C |
| Test 2 | 2% | 2000 ppm | 5000 ppm | C |
| Test 3 | 2% | 1000 ppm | 7500 ppm | C |
| Test 4 | 2% | 2000 ppm | 7500 ppm | C |
| Test 5 | 2% | — | 5000 ppm | H |
| Test 6 | 2% | — | 7500 ppm | I |
| THR-2 | | | | |
| Test 8 | 3% | 1000 ppm | 7500 ppm | Precipitate |
| Test 9 | 5% | 1000 ppm | 7500 ppm | C |
| Test 10 | 3% | 2000 ppm | 7500 ppm | Precipitate |
| Test 11 | 5% | 2000 ppm | 7500 ppm | B |

3.2.3—Gel after Addition of Polymer P-100 to THR Solutions

Table 6 reports the gelation results after addition of P-100 to the THR solutions at 86° C. Addition of P-100 seems to weaken the gel consistency.

TABLE 6

| Test | KCl | P-100 | THR | Gel quality |
|---|---|---|---|---|
| THR-1 | | | | |
| Test A | 2% | 2000 ppm | 5000 ppm | B |
| Test B | 2% | 5000 ppm | 5000 ppm | A |
| THR-2 | | | | |
| Test A | 2% | 2000 ppm | 5000 ppm | B |
| Test B | 2% | 5000 ppm | 5000 ppm | A |
| Test C | 2% | 2000 ppm | 7500 ppm | B |
| Test D | 2% | 5000 ppm | 7500 ppm | B |
| Test E | — | 2000 ppm | 5000 ppm | B |
| Test F | — | 2000 ppm | 7500 ppm | B |
| Test G | — | 5000 ppm | 5000 ppm | B |
| Test H | — | 5000 ppm | 7500 ppm | C |
| Test I | — | 4500 ppm | 7500 ppm | C |
| Test J | — | 4000 ppm | 7500 ppm | B |
| Test K | — | 3333 ppm | 5000 ppm | A |
| Test L | — | 2500 ppm | 3750 ppm | A |

3.3 Conclusions

Six of the eight tested THRs were able to form gels at temperature ranging between 25 and 80° C.

Two of the eight tested THRs did not form gel in this interval of temperature.

Gelation is very rapid once the threshold temperature is reached.

Gel temperature is higher during ramp up of temperature than during cooling down.

Gel temperature decreases when brine salinity increases.

Gel temperature increases when THR concentration increases.

The best gel quality is obtained at a THR concentration around 7500 ppm.

Addition of Polymer or Microgel weakens gel consistency without delaying gel kinetics.

As described above, it is advantageous to select the THR solution depending on the temperature of the subterranean zone to be treated. Preferably, the THR solution is chosen so that said temperature $T_{int}$ of the subterranean zone is equal or superior to the gel temperature $T_g$ of said THR solution.

As indicated above, it is possible to modify the gel temperature of a THR solution by varying the brine salinity and/or the THR concentration, in order to adapt the solution to the temperature of the subterranean zone to be treated.

4—Coreflood Experiment with THR-5

4.1—Experimental Conditions

A solution of thermo-thickener THR-5 is prepared at the concentration of 7500 ppm in a 2% KCl brine. The relative viscosity is equal to 100 at the gradient of injection (30 sec$^{-1}$) and at the temperature of injection (24° C.).

The core used in this experiment is a Clashach sandstone whose permeability is 1974 mD at 24° C., and 2018 mD at 70° C. at a brine saturation of 100%.

Table 7 gives main parameters of the coreflood.

After saturation of the core with brine, 5 pore volumes of thermo-thickener are injected while keeping the core at $T_{int}=T_0=24°$ C. (i.e. below the gel temperature). The thermothickener solution saturates the core and lines are flushed at core inlet and outlet to avoid gelation in the lines.

The temperature is set at 70° C. and the core shut in for 48 hours.

Then, brine is injected at 70° C., while varying the injection rate, thus the shear rate, between 200 and 3800 sec$^{-1}$.

TABLE 7

Coreflood general conditions

| Temperature $T_{int}$ (° C.) | 24 | 70 |
|---|---|---|
| Brine viscosity (cPo) | 0.9394 | 0.447 |
| Permeability K (mD) | 1974.04 | 2018.43 |
| Pore radius $R_p$ (µm) | 8.47 | 8.57 |

4.2—Coreflood Test Results and Discussion

After gel set in the core, the permeability drops from 2000 to 60 mD (Table 8). The permeability reduction Rk, which is the ratio between initial and final permeability, varies between Rk=30 to 50 when the injection rate is ramped up and down (Table 9).

The coreflood test shows that the thermo-thickener, once gelled, induces a very strong drop in water permeability, and, as such, is a good waterflood diverter to solve the problems of water channelling through high-permeability streaks.

TABLE 8

Water permeability after gelation of THR-5

| Brine viscosity (cPo) | 0.447 |
|---|---|
| Permeability K (mD) | 66.18 |
| Pore radius $R_p$ (µm) | 1.55 |

TABLE 9

Evolution of Permeability Reduction after gelation of THR-5

| Q | 1$^{st}$ Injection Sequence | | | | | 2$^{nd}$ Injection Sequence | | | |
|---|---|---|---|---|---|---|---|---|---|
| (cm³/h) | 5 | 10 | 20 | 50 | 100 | 50 | 20 | 10 | 5 |
| $R_K$ | 49 | 42 | 36 | 32 | 30 | 31 | 32 | 33 | 35 |
| Shear rate (s$^{-1}$) | 212 | 411 | 821.5 | 1927.5 | 3796.5 | 1898 | 771 | 385.5 | 196 |

5—Coreflood Experiment with THR-9

5.1—Experimental Conditions

A solution of NIPAM-grafted polyacrylamide (THR-9) is prepared at the concentration of 5000 ppm in a 2% KCl brine.

The NIPAM-grafted polyacrylamide was prepared by copolymerization of 10% N-isopropylacrylamide with 90% acrylamide.

The relative viscosity is equal to 40 at the gradient of injection (30 sec$^{-1}$) and at the temperature of injection (25° C.).

The core used in this experiment is a Sandstone whose permeability is 335 mD at 25° C. at a brine saturation of 100%.

Table 10 gives main parameters of the coreflood.

After saturation of the core with brine, 3 pore volumes of NIPAM-grafted polyacrylamide are injected while keeping the core at $T_{int}$=53° C. The solution saturates the core and lines are flushed at core inlet and outlet to avoid gelation in the lines.

The core is then shut in for 48 hours to allow the gel to set.

Then, brine is injected at 53° C., while varying the injection rate, thus the shear rate, between 15 and 100 sec-1.

TABLE 10

Coreflood general conditions

| Temperature $T_{int}$ (° C.) | 53 |
|---|---|
| Brine viscosity (cPo) | 0.525 |
| Permeability K (mD) | 335 |
| Pore radius $R_p$ (µm) | 3.36 |

5.2—Coreflood Test Results and Discussion

After gel set in the core, the permeability reduction Rk, which is the ratio between initial and final permeability, decreases from 117 to 42 when the injection rate is increased from 5 to 100 cm³/h (Table 11).

The coreflood test shows that the NIPAM-grafted polyacrylamide, once gelled, induces a very strong drop in water permeability, and, as such, is a good waterflood diverter to solve the problems of water channelling through high-permeability streaks.

TABLE 11

Evolution of Permeability Reduction after gelation of THR-9

| | Injection Sequence | | |
|---|---|---|---|
| Q (cm³/h) | 5 | 10 | 100 |
| $R_K$ | 117 | 68 | 42 |
| Shear rate (s$^{-1}$) | 16 | 31.9 | 319 |

The invention claimed is:

1. A process for the treatment of a rock formation or cavity, comprising the following steps:
    injection of water into the rock formation or cavity, said water being at a temperature ($T_w$),
    injection, into said rock formation or cavity, of a water solution of a water-soluble thermo-thickening polymer, said thermo-thickening polymer being able to form a gel at a threshold temperature ($T_g$), and ($T_w$) is inferior to the threshold temperature ($T_g$)
    the thermo-thickening polymer solution being injected in liquid form, at an injection temperature ($T_0$) inferior to said threshold temperature,
    the thermo-thickening polymer being a cellulose chain, partially etherified with $C_1$-$C_6$ alkyl or hydroxyalkyl groups
    so that a gel is formed by the thermo-thickening polymer solution inside the rock formation or cavity, at an inner temperature ($T_{int}$) of the rock formation or cavity, said inner temperature being equal or superior to the threshold temperature ($T_g$).

2. A process according to claim 1, wherein the process also comprises a step of injecting water into the rock formation or cavity, said step occurring between the injection of the thermo-thickening polymer solution and the formation of the gel.

3. A process according to claim 1, wherein the thermo-thickening polymer is selected from the group consisting of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose and mixtures thereof.

4. A process according to claim 1, wherein the concentration of the thermo-thickening polymer water solution ranges between 2500 ppm and 20000 ppm.

5. A process according to claim 4, wherein the concentration of the thermo-thickening polymer water solution ranges between 2500 ppm and 12500 ppm.

6. A process according to claim 1, wherein the thermo-thickening polymer water solution also comprises up to 10% by weight of an inorganic salt.

7. A process according to claim 1, wherein the thermo-thickening polymer water solution also comprises an acrylamide-based polymer or copolymer, at a concentration between 50 and 10000 ppm, the concentration of said polymer or copolymer being lower than or equal to the thermo-thickening polymer concentration.

8. A process according to claim 1, wherein the thermo-thickening polymer water solution also comprises a microgel at a concentration between 50 and 5000 ppm, the microgel concentration being lower than or equal to the thermo-thickening polymer concentration.

* * * * *